United States Patent
Kirschner

[11] Patent Number: 5,878,723
[45] Date of Patent: Mar. 9, 1999

[54] SYSTEM FOR CONTROLLING FUEL, METERING INTO AN INTERNAL COMBUSTION ENGINE

[75] Inventor: Michael Kirschner, Ludwigsburg, Germany

[73] Assignee: Robert Bosch GmbH, Stuttgart, Germany

[21] Appl. No.: 945,841

[22] PCT Filed: Oct. 11, 1996

[86] PCT No.: PCT/DE96/01943

§ 371 Date: Nov. 4, 1997

§ 102(e) Date: Nov. 4, 1997

[87] PCT Pub. No.: WO97/36100

PCT Pub. Date: Oct. 2, 1997

[30] Foreign Application Priority Data

Mar. 26, 1996 [DE] Germany .................. 196 11 803.4

[51] Int. Cl.⁶ .................................................. F02M 39/00
[52] U.S. Cl. .......................................... 123/506; 123/458

[58] Field of Search ..................................... 123/458, 506, 123/500, 501, 494

[56] References Cited

U.S. PATENT DOCUMENTS

| | | | |
|---|---|---|---|
| 5,085,193 | 2/1992 | Morikawa | 123/458 |
| 5,201,294 | 4/1993 | Osuka | 123/458 |
| 5,267,546 | 12/1993 | Siebert et al. | 123/506 |
| 5,313,924 | 5/1994 | Regueiro | 123/458 |

FOREIGN PATENT DOCUMENTS 35 40 811  5/1987  Germany .

*Primary Examiner*—Thomas N. Moulis
*Attorney, Agent, or Firm*—Kenyon & Kenyon

[57] ABSTRACT

A system for controlling fuel metering into an internal combustion engine, in particular a self-igniting internal combustion engine, is described. An electromagnetic valve influences the beginning and/or the end of fuel metering. An inductive pressure sensor is provided, which generates a signal corresponding to the pressure in a high-pressure area.

8 Claims, 2 Drawing Sheets

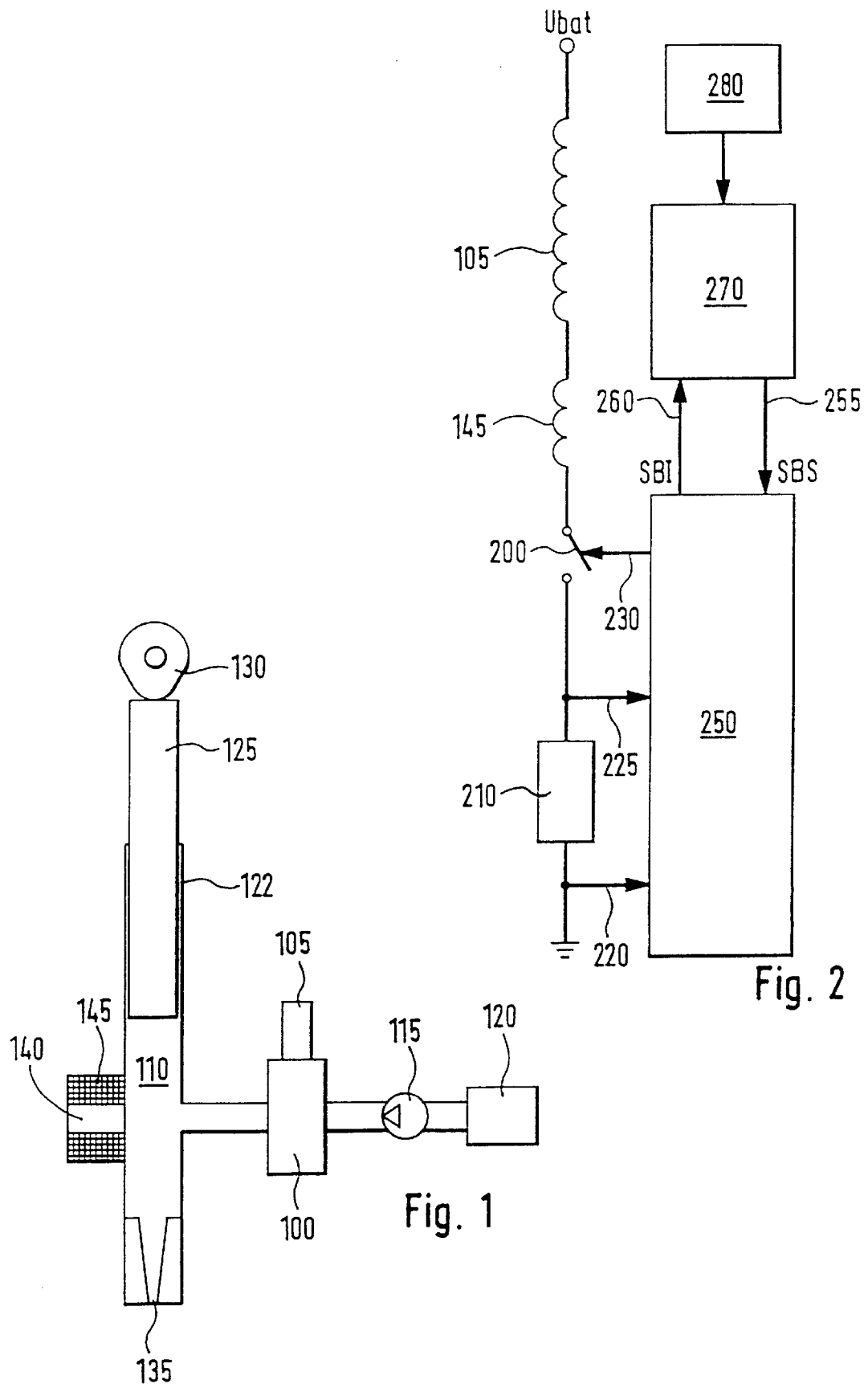

SYSTEM FOR CONTROLLING FUEL, METERING INTO AN INTERNAL COMBUSTION ENGINE

BACKGROUND INFORMATION

The present invention concerns a system for controlling fuel metering into an internal combustion engine.

Such a system for controlling fuel metering into an internal combustion engine is known from DE-OS 35 40 811, where a process and a device for controlling fuel metering into an internal combustion engine, in particular a self-igniting internal combustion engine, is described. The fuel metering system described therein is referred to as a pump-nozzle system, where a cam shaft drives a pump piston in a pump cylinder. An electromagnetic solenoid valve controls the fuel flow to an element space depending on a variety of operating parameters. The pressure in the element space is not measured in this device; therefore accurate fuel metering is not possible.

Furthermore, DE-OS 34 26 799 (U.S. Pat. No. 4,653,447) discloses a process and a device for controlling fuel metering, where the beginning and the end of fuel delivery can be controlled using a solenoid valve. The beginning and the end of fuel delivery, determined by the solenoid valve, is detected by the variation of the flow through the solenoid valve.

SUMMARY OF THE INVENTION

With the procedure according to the present invention, accurate control of fuel metering into an internal combustion engine is possible.

This advantage is achieved at a low cost; in particular, no additional lines or cable connections are required between the fuel metering unit and the control.

DESCRIPTION OF THE DRAWINGS

FIG. 1 shows a block diagram of a fuel metering system according to the present invention.

FIG. 2 shows a circuit block diagram of a fuel metering device according to the present invention.

DETAILED DESCRIPTION OF THE DRAWINGS

Figure 3A:
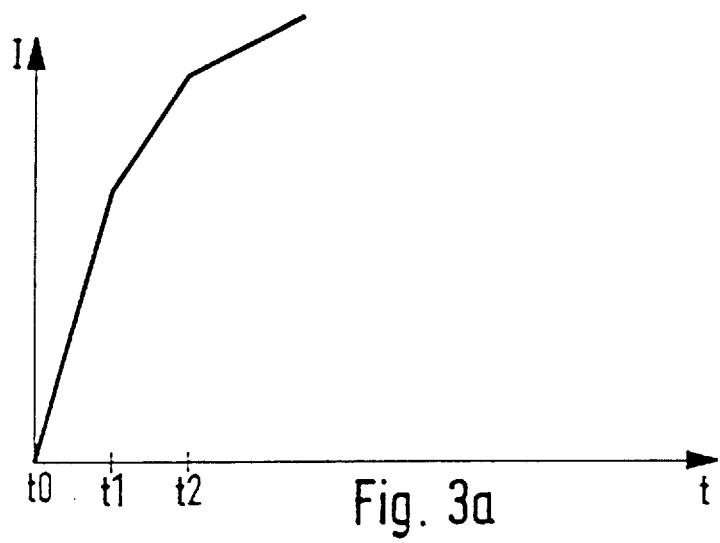
FIG. 3a shows a graph of current over time in the fuel metering device according to the present invention.

The process according to the present invention is explained below using the example of a pump-nozzle unit. The process according to the present invention is not limited, however, to this application. It can be used in any fuel metering system where an inductive sensor, in particular a pressure sensor, and an electromagnetic valve are used. This can also be the case, for example, in solenoid valve-controlled distributor pumps and common rail systems. The process according to the present invention can also be used with systems where the electromagnetic valve determines only the beginning or only the end of metering.

FIG. 1 shows the device according to the present invention for controlling fuel metering as a simplified block diagram. An electromagnetic solenoid valve 100, comprising a coil 105, provides communication between an element space 110, which can also be referred to as the high-pressure area, and a low-pressure area. A fuel delivery pump 115 delivers fuel from a fuel storage container 120 into the low-pressure area.

Element space 110 is formed by a pump cylinder. A pump piston 125 is arranged in pump cylinder 122. Pump piston 125 is driven by a cam 130, which is driven by a shaft. Pump piston 125 and an injection valve 135 delimit element space 110. A pressure sensor 140, comprising a coil 145, is arranged in element space 110.

This device operates as follows. Fuel delivery pump 115 delivers fuel from storage container 120 into element space 110. Cam 130, driven directly by a shaft, for example, the cam shaft of the internal combustion engine, drives pump piston 125. Pump piston 125 moves up and down depending on the position of cam 130. During its downward movement, the fuel in element space 110 is pressurized by pump piston 125. When a certain pressure is reached, injection valve 135 opens and the fuel is injected through injection nozzle 135 into the combustion chamber of the internal combustion engine.

Pressure can only build up in element space 110 when solenoid valve 100 is closed. If solenoid valve 100 is open, pressure cannot build up and therefore injection is impossible. The beginning and the end of fuel delivery can be controlled by opening and closing solenoid valve 100. When the solenoid valve opens or closes, the inductance of coil 105 changes. This change in the inductance of coil 105 can be detected by analyzing the current variation.

Pressure sensor 140 measures the pressure in element space 110. It is provided according to the present invention that when a predefined pressure is reached, the pressure sensor generates a signal. For this purpose, the pressure sensor is designed so that when a pressure threshold is reached, the inductance of coil 145 changes. Pressure sensor 140 is, for example, a type of barometric box integrated in the pump-nozzle unit. When a pressure threshold is reached, a magnetically conductive armature moves in the coil, resulting in a change in the inductance of coil 145.

It is provided according to the present invention that coil 145 of pressure sensor 140 and coil 105 are connected in series. By measuring the overall inductance, both the change in inductance of pressure sensor 140 and the change in the switching state of solenoid valve 100 can be detected. By connecting the solenoid valve winding and the pressure sensor in series, no additional connections are required on the pump-nozzle unit. Furthermore no additional cables are necessary between the pump-nozzle unit and a controller.

FIG. 2 shows the electric wiring of the different elements. Elements described in FIG. 1 are denoted by the same numbers. Coil 105 of solenoid valve 100 and coil 145 of pressure sensor 140 are connected in series. They are connected to battery voltage Ubat and also to switching means 200. A second terminal of switching means 200 is grounded through measuring means 210. The measuring means is, in the simplest embodiment, an ohmic resistor. The terminals of the battery voltage and the ground can also be switched around.

Switching means 200 receives triggering signals from a controller 250 via conductor 230. At the point of connection between switching means 200 and measuring means 210, a signal arrives at controller 250 via conductor 225. In a similar manner, a signal arrives at controller 250 from the second terminal of the measuring means and the ground via a conductor 220.

The inductances, switching means 200, and measuring means 210 can also be arranged in a different order in the series between battery voltage Ubat and the ground.

The control sends signals SBI to motor control 270 via a conductor 260 and receives signals SBS from motor control 270 via conductor 255. Motor control 270 receives signals from various sensors 280. These are, for example, rotation speed sensors and sensors detecting driver commands.

Based on the output signals of sensors 280, which measure the various operating parameters, motor control 270 computes various signals that determine fuel metering. Thus, for example, motor control 270 gives controller 250 a fuel amount command for the injected amount and a signal that characterizes the start of injection. Controller 250 controls, as a function of this signal and any other signals, switching means 200 via control line 230.

Controller 250 analyzes the voltage drop at measuring means 210. This voltage drop is a measure of the current flowing through inductances 105 and 145. Based on the variation of the current, the controller detects the start of injection SBI and issues a corresponding signal to the motor control. Furthermore, controller 250 detects the point in time when the pressure sensor generates a signal indicating that the pressure in element space 110 has exceeded a predefined threshold value.

Figure 3B:
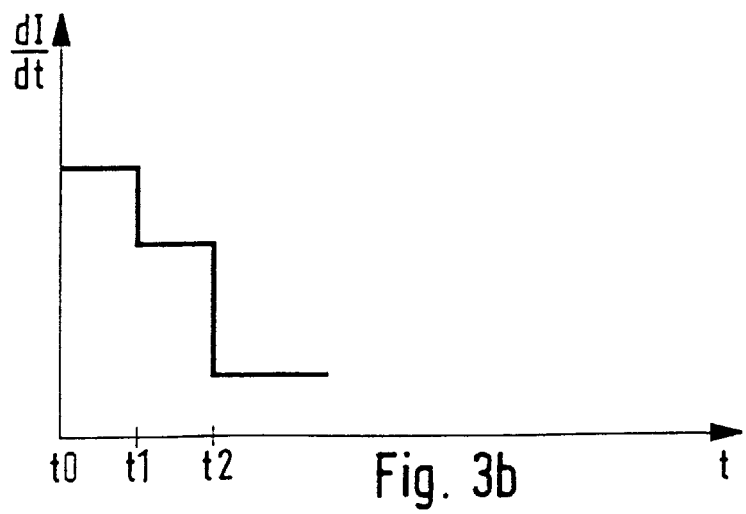
FIG. 3b shows a graph of the derivative of current over time in the fuel metering device according to the present invention.

The variation of the current and the variation of the current derivative is plotted against time T in FIGS. 3a and FIGS. 3b. The graph of the current and the current derivative is drawn in a highly simplified form in FIGS. 3a and FIGS. 3b.

FIG. 3a shows the variation of the current and FIG. 3b shows the variation of the time derivative dI/dt over time t.

At time t0, controller 250 issues a signal over triggering line 230, so that switching means 200 closes and the current flow through inductances 105 and 145 is enabled. This results in an increase in the current over time. The current increase is very steep, which results in a high value for the derivative of the current dI/t. At time t1, the solenoid valve changes its position, i.e., it switches to its closed position. This results in a change in the inductance, which leads to flattening of the current increase.

Starting at time t1, the derivative of the current dI/dt assumes a lower value. By analyzing the current variation, for example, by analyzing the derivative of the current over time, time t1 can be determined by controller 250. Other methods can also be used for determining time t1.

Closing of solenoid valve 100 results in the pressure increasing in element space 110. At time t2, the pressure in element space reaches a threshold resulting in a response by the pressure sensor. This means that the inductance of coil 145 of the pressure sensor also changes. This results in the pressure increase further flattening and the derivative dI/dt assuming a smaller value.

By analyzing the variation of the current, for example, the derivative of the current, this time t2 can also be reliably detected by controllers 250.

By analyzing the current variation, in particular the derivative of the current, the controller can reliably detect two parameters. These are the switching time of the solenoid valve, which corresponds to the start of delivery, and the reaching of the threshold value by the pressure, which is a measure for the start of injection.

The variation of current I illustrated in FIG. 3a and the derivative of the current dI/dt illustrated in FIG. 3b are given as examples only. Depending on the design of the solenoid valve and the type of the solenoid and the pressure sensor, other current variations may also result. The common feature of all current variations is that at time T1 and time t2, when the solenoid valve 100 assumes its new position (the pressure switch switches), there is a change in the current. In particular there is a change in the current increase. This means that the derivative of the current dI/dt changes suddenly.

Alternatively it can be provided that the current is regulated to a predefined value. In this case, the voltage applied to the series connection of the inductances changes. By analyzing the voltage variation, the times of change in the inductances can also be detected.

These times, when the current variation undergoes a change, can be detected by a multiplicity of procedures, such as those described in DE-OS 34 26 799, for example.

What is claimed is:

1. A fuel metering system for an internal combustion engine, comprising:

an electromagnetic valve having a first inductance, the electromagnetic valve influencing at least one of a beginning of fuel metering and an end of fuel metering via a switching; and a sensor having a second inductance, the sensor generating a signal indicative of a status of the metering system;

wherein the electromagnetic valve and the sensor are electrically coupled such that the first inductance and the second inductance are electrically in series.

2. The system according to claim 1, wherein the internal combustion engine is a self-igniting internal combustion engine.

3. The system according to claim 1, wherein at least one of the first inductance and the second inductance changes over time.

4. The system according to claim 1, wherein at least one of a time and a pressure at which the switching of the electromagnetic valve occurs is detected as a function of a change in at least one of the first inductance and the second inductance.

5. The system according to claim 1, wherein a current flowing through the electromagnetic valve and the sensor is measured.

6. The system according to claim 5, wherein a change in at least one of the first inductance and the second inductance is detected based on a change in a variation of the current over time.

7. The system according to claim 1, wherein the sensor is a pressure sensor for sensing a pressure in the metering system.

8. The system according to claim 1, wherein at least one of a beginning of injection and the beginning of fuel metering is determined.

* * * * *